May 29, 1934.   H. E. ANDERSON   1,960,430
JOURNAL BEARING
Filed May 21, 1930   4 Sheets-Sheet 4

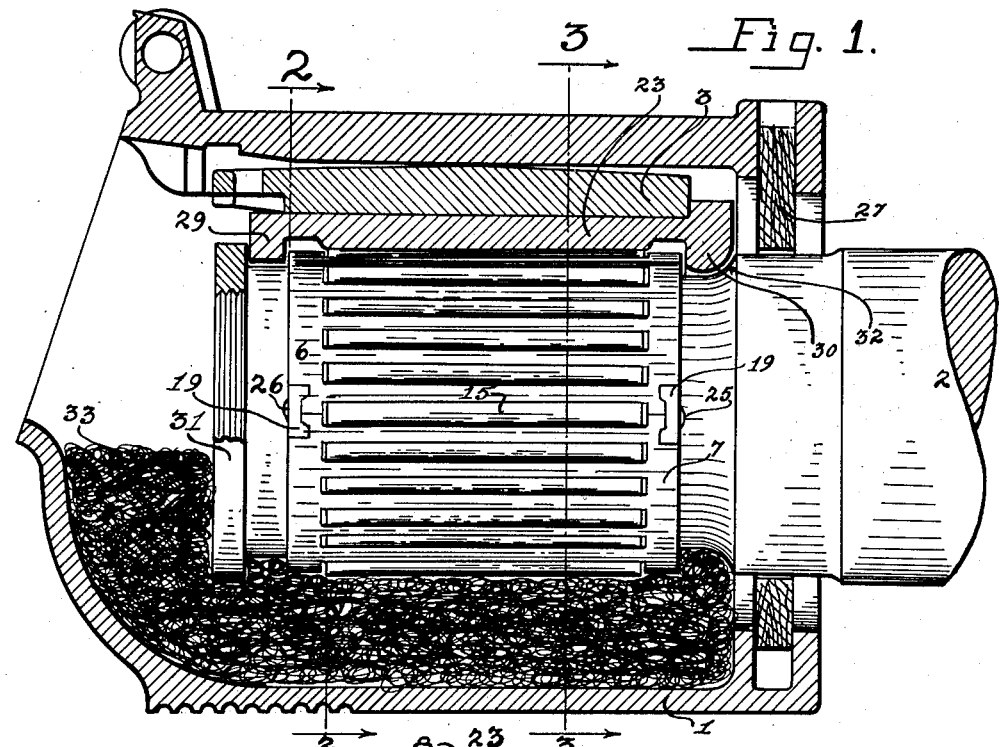
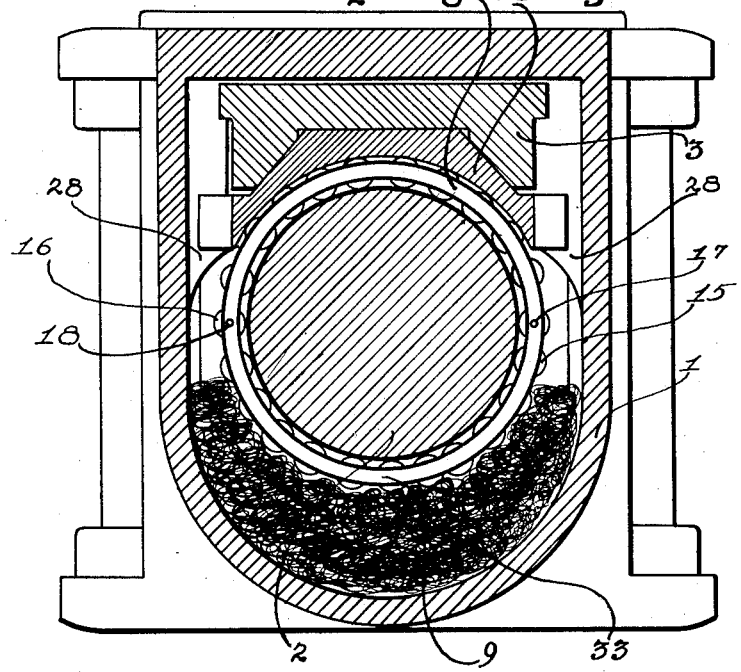

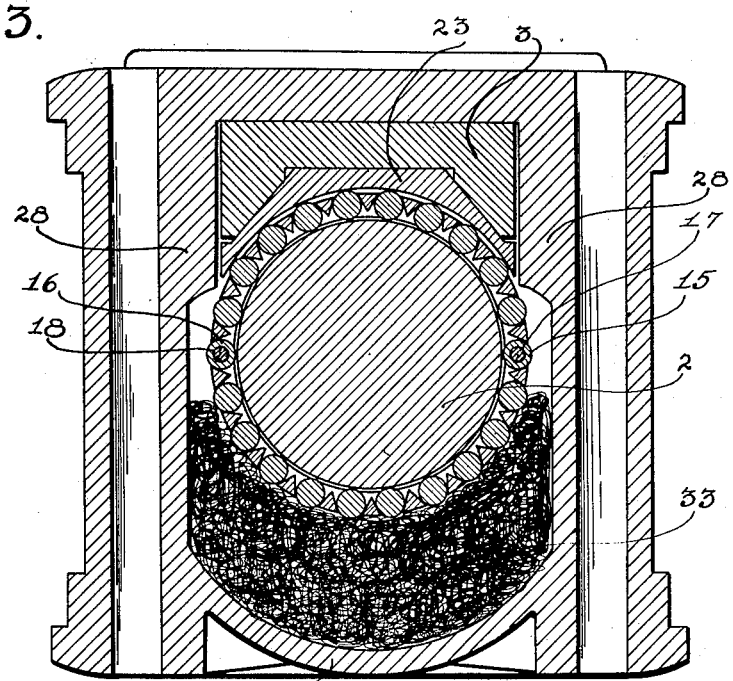

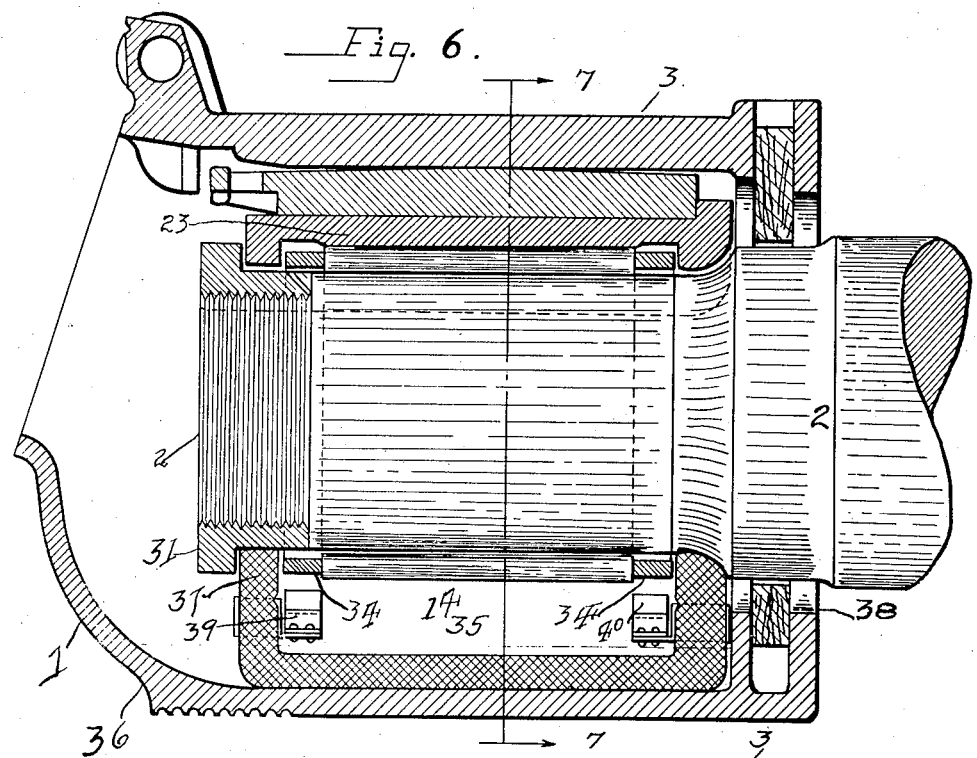
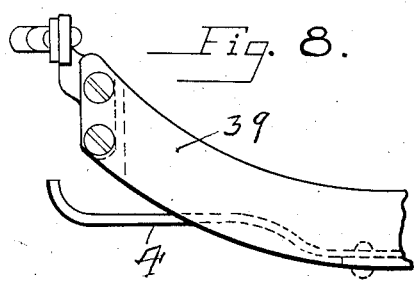
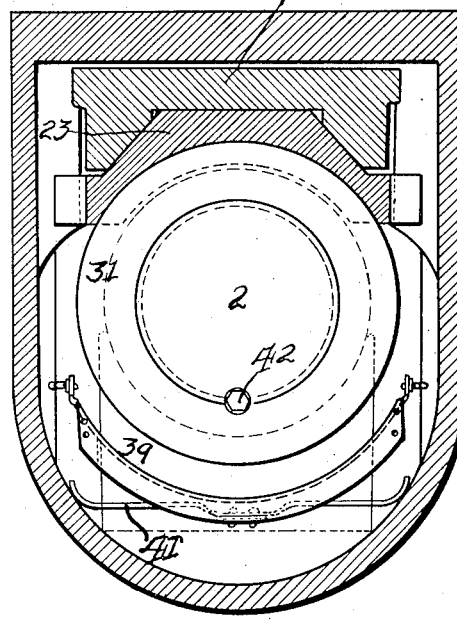

INVENTOR
Harley E. Anderson
BY
Harvey Lea Dodson
ATTORNEY

Patented May 29, 1934

1,960,430

UNITED STATES PATENT OFFICE 1,960,430

JOURNAL BEARING

Harley E. Anderson, Kansas City, Mo., assignor to Gustin-Bacon Manufacturing Co., Kansas City, Mo., a corporation of Missouri Application May 21, 1930, Serial No. 454,306

4 Claims. (Cl. 308—180)

This application is a continuation in part of my copending application, Serial No. 389,621.

My invention relates to anti-friction bearings to be used for a railroad car axle. Many different bearings have been designed for this purpose, the principal objection to their use being that they require extensive alterations of the A. R. A. standard car axles, journal bearings and car axle boxes.

It is well known that the standard car axle has a collar at its outer end. This collar receives the end thrust in one direction on one end of the standard A. R. A. brass journal bearing, the thrust in the other direction being taken by a fillet, turned on the axle, which engages the opposite end of the brass journal bearing, which rides between the two. The anti-friction bearings which have been employed by railroads up to the present time, require that this collar be turned off. Moreover, the standard box cannot be used and has to be entirely discarded, as does the dust guard, which necessitates the provision of a substitute dust guard. Furthermore, the bearings are not easily accessible for inspection, and where tapered rollers are employed, they require adjustment. All these facts have militated against the more universal use of roller bearings by the railroads, notwithstanding their obvious advantages.

My invention has for its principal object, to provide an anti-friction bearing, of the roller type, which can be used upon the standard A. R. A. equipment without any change in the journal box standard axle and journal bearing wedge, except that I do not use the brass journal bearing, for the obvious reason that it is not anti-friction. Also, in utilizing my construction, I have discovered that the diameter of the standard axle varies as much as $\frac{1}{32}''$ from one end to the other. This has a tendency to cause the rollers to creep toward the end of the axle which has the largest diameter, and this condition causes excessive wear on the edge of the cage; consequently, before equipping a car with my improved bearings, I mount the axles in an axle lathe and true them up, so that the micrometer measurements will be the same at both ends. While the axle is in the lathe, I turn the collar off of the end of the journal, and thread this space to receive a ring collar, which is very desirable when a solid one-piece cage is utilized.

My invention has for its further object, to provide for the utilization of the standard journal box waste packing for lubrication, and also to construct the bearing so that the over-all diameter of the bearing, when in place on the journal, will be exactly the same diameter as is the collar on the end of the journal, so that the box can be slipped on over the rollers after the standard dust guard has been placed in position in the box.

A further object is, to do away with the outer race or care for the bearing. My outer race or bearing is only part of a circle, or, in other words, only where the load is. The usual outer race extends all the way around. The under side of the rollers and cage in my bearing is always exposed to the waste packing for lubrication purposes, and forms for all practical purposes the outer race for the lower half of the bearing. The cage which holds the rollers in their spaced relation to each other is, in my invention, called upon to perform another duty. It must carry the rollers around under the journal and feed them up under the bearing (which, as stated, does not continue completely around as an outer race would in standard practice). There is no strain on this cage, other than to carry the rollers after they are out from under the bearing. In other bearings the cylindrical outer race carries the rollers all the way around.

In this construction it will be apparent that the rollers, when passing over the waste packing, roll in the opposite direction of that of the journal. In standard construction it is not an unusual occurrence for waste packing to grab or stick to a revolving journal, and if one thread from the packing sticks to a revolving journal and lodged under the friction brass bearing, this journal runs hot. I have found in practice that a thread will not grab the rollers of my device. If it should be carried up it would roll on over and not lodge under the bearing. This is a very desirable feature.

Another feature of my bearing is, that when a car arrives at a terminal, the inspector can easily raise the journal box lid, stir up the waste packing and add more oil, as he does today with the standard friction journal bearing.

Still another important feature is, that my bearing can be utilized for a journal which is worn to a diameter much smaller than normal. The only thing that would happen in such a case, where the journal was worn to smaller diameter (or, in other words, to a diameter equal to the condemning diameter), would be that the rollers would not quite touch the journal at the bottom, unless the waste packing were strong enough to push the rollers up against the smaller diameter journal. In either event, no harm would be done.

I do not use a hardened inner race between the journal and the rollers, but permit the rollers to roll directly on the present journal as it is constructed. In case, however, it is deemed desirable to use a hardened shell between the present journal and the rollers, this can be done by having one made up, either in one piece, split so it would spring over the end collar, or it can be made of two pieces and fastened together by dowel pins or some other known method. In that event, I would then use the next larger size journal box in conjunction with this particular axle, for there is not enough clearance in the standard box of a given size, using the same size axle. In other words, if I wanted to use a hardened inner race between the journal and the rollers, on a 5½" x 10" journal axle I would use a 6" x 11" box. I am sure that a hardened inner race can be made in two pieces with a fishtail joint and not fastened together at all, for when the rollers and the cage are fastened around this hardened inner race it cannot get away. For such construction I would use a fishtail joint, to insure the rollers passing over the joint without any bump or jar.

My invention has for a further object, to provide a construction whereby a one-piece cage can be employed, by fitting a detachable collar to the end of the axle.

Another object is, to provide an improved method of lubrication, in which a wick is mounted in a well of oil, and carries the lubricant up to the bearing.

A concrete embodiment of my invention is illustrated in the accompanying drawings, hereto annexed and to be considered as part of this specification, in which—

Fig. 1 is a vertical sectional view through a standard A. R. A. journal box and journal bearing wedge, the axle and my improved bearing being shown in elevation;

Fig. 2 is a view taken on line 2—2 in Fig. 1;

Fig. 3 is a view taken on line 3—3 in Fig. 1;

Fig. 4 is a fragmentary detail view of the cage and the rollers, showing the means I use to fasten the cage together;

Fig. 5 is a section taken on line 5—5 in Fig. 4;

Fig. 6 shows a one-piece cage and rollers therefor;

Fig. 7 is a cross-section taken on line 7—7 in Fig. 6;

Fig. 8 is an enlarged fragmentary detail view of the means for supporting the wick.

Similar reference numerals refer to similar parts throughout the entire description.

Figure 9:
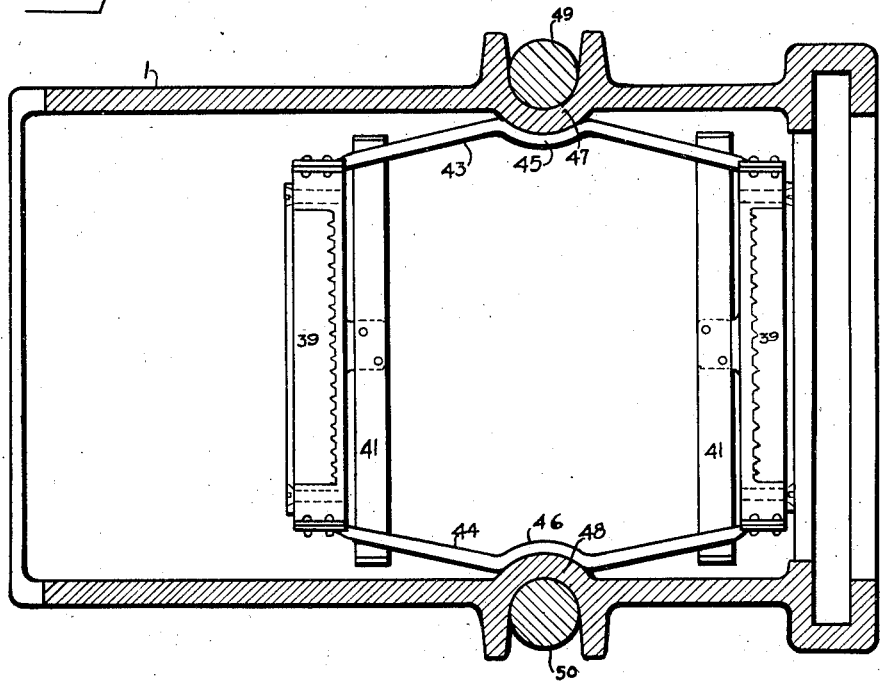
Fig. 9 is a plan view of my locking means to prevent the wick frame from moving longitudinally on the bearing.

As shown in the drawings, the journal box 1 is the standard A. R. A., as are also the axle 2 and the wedge 3. A ring collar 31 is fitted to threads cut on the end of the axle 2.

My bearing comprises a cage 4, formed with a plurality of spacers which connect the two annular end pieces 6 and 7. These end pieces 6 and 7 are made in halves 8 and 9, which are preferably cast, or formed of some hard tough bronze alloy, although they may be forged. The two halves 8 and 9 are connected to each other, as clearly shown in the detail views, in the following manner: Grooves 10, having parallel recesses 11 and 12, are machined in the adjacent ends of the halves 8 and 9 (the two halves being clamped together for that purpose), and a hole 13, having its center at their meeting plane is drilled through the end pieces 6 and 7 at the meeting ends of the halves 8 and 9. A key lock 19, having legs 20 and 21 which are fitted to and coincide with the parallel recesses 11 and 12, is mounted in each groove 10, the top coming flush with the surface of the end pieces 6 and 7.

A plurality of rollers 14 are mounted intermediate the spacers 5. The rollers 15 and 16, which are located in the spaces adjacent the meeting ends of the halves 8 and 9, are tubular the inside diameter being larger than the outside diameter of rods 17 and 18, the ends of which are mounted in the holes 13. An aperture 22, which registers with the holes 13, is formed in each of the key locks 19. These apertures fit the ends of the rods 17 and 18.

The outer race or bearing 23 of my invention is formed of brass, of semicircular configuration, the exterior surface of which conforms exactly to the dimensions of the standard A. R. A. brass journal bearing. The rollers I use are $\tfrac{9}{16}$" in diameter, and the outer race is $\tfrac{9}{16}$" thick. This conforms exactly to the dimension specified in the M. C. B. cyclopedia.

I assemble my device as follows:

The rollers 14 are mounted in the respective halves of the cage 4, which are then placed on the journal of the car axle 2. The rollers 15 and 16 are then placed in position. One end of the rods 17 and 18 is headed as at 25. A key lock 19 is then slipped on to each rod adjacent this end, and the rods are then passed through the holes 13 in the end pieces 5 and 6 and through the rollers 15 and 16. Other key locks 19 are then fitted in the recesses 11 and 12 in the end pieces 5 and 6, the ends 26 of the rods 17 and 18 entering the apertures 22. The end 26 of each of the rods 17 and 18 is peened over, and the cage 4 and rollers 14, 15 and 16, are held securely on the journal. It will be seen that this follows, because the legs 20 and 21 on the key locks 19 keep the halves 8 and 9 of the cage 4 from separating, and the rods 17 and 18 keep the two halves 8 and 9 from moving longitudinally.

The journal box 1, provided with the standard dust guard 27, is then placed in position. The outer race 23 is then placed on top of the rollers 14, 15 and 16, and behind the lugs 28 (which are cast on all standard boxes). The lips 29 and 30, which depend downwardly from the ends of the race 23, engage the collar 31 and fillet 32 formed on the car axle 2, and care for the inward and outward end thrust. This is just as it is taken care of in the present approved practice, using the standard friction brass journal. The wedge 3 is then placed in position.

I then pack the box 1 in the usual manner, with standard journal box waste packing 33. This waste packing 33, when packed up under the rollers 14 and journal 2, has a tendency to act as an outer race for the rollers 14, thereby relieving the cage 4 from carrying the rollers 14 at the bottom and up nearly to the center line of the journal 2. In other words, the only place where I actually do not have an outer bearing of some kind is a small gap between the upper bearing 23 on top, and the waste packing 33; and since I have the bearing 23 on top of the rollers 14, which covers, and is bearing on, practically one-third of the total number of rollers, I provide ample bearing surface, for it is considered, by those experienced in the art, that this is the number of rollers which actually carries the load, even when a continous outer race is used all around the journal.

As shown in Figs. 6, 7, 8 and 9, in place of the divided cage 4 shown in the other figures, I substitute a one-piece cage 34, in which to mount the rollers 14; and lubrication is provided by means of a wick 35, the bottom of which rests on the bottom of the journal box 1, being immersed in oil, the level of which is indicated by the dotted line 36. The ends 37 and 38 of the wick 35 extend upwardly, and bear against the axle 2, being supported by means of clamps 39 and 40. Bow springs 41 are provided for the purpose of holding the wick 35 pressed against the axle 2, although any other suitable or convenient means may be employed for this purpose.

When utilizing the construction shown in Figs. 6, 7, 8 and 9, the ring collar 31 is screwed off the threads, and the one-piece cage 34 is slipped over the bearing which, as already described, has been machined accurately so as to prevent excessive wear on either end of the cage 34. The ring collar 31 is then screwed back into place, where it may be secured by any well known means. As shown, this means comprises a screw key 42, although any type of device may obviously be utilized for this purpose.

As shown in Fig. 9, I provide means for locking the wick frame in position. It is held from longitudinal movement by two rods 43 and 44, which are formed of resilient material, and provided with concave portions 45 and 46, which are adapted to snap into place around projections 47 and 48 on the journal box 1. These projections 47 and 48 extend into the journal box 1 at the center line of vertical truck bolts 49 and 50.

This is very important, because if the wick 35 moves toward the right or front end of the journal box 1, obviously the wick 35 will not lubricate the ends of the cage 34, the collar 31, nor the fillet 32 of the journal.

Moreover, I have found that by keeping this wick 35 packed tightly against the rear end of the journal box 1, the oil is prevented from slopping out through the openings at 38, for as the dust guard 27 wears on the top of the axle 2, necessarily it sags down and increases the opening between the dust guard 27 and the axle 2 at the bottom.

This construction of the locking means to prevent longitudinal movement of the wick frame, permits of convenient removal of the wick frame from the journal box 1, which the axle 2 is still projecting into the journal box 1, as the rods 43 and 44 are sufficiently resilient to permit them to yield and slip out from the projections 47 and 48.

Having described my invention, what I regard as new, and desire to secure by Letters Patent of the United States, is:

1. In a standard railroad car journal box, having a standard journal bearing wedge, a car axle, threads cut on the ends of said axle, ring collars mounted on said threads, a roller bearing mounted on said axle, and a semi-circular outer race at the top of said bearing, the exterior of which race conforms to the standard brass journal bearing, a wick, the bottom of which rests on the bottom of the journal box, the ends of said wick contacting the journal adjacent the ends of the roller bearing, the bottom of said wick being immersed in oil, a pair of wick holders, bow springs which hold said wick pressed against said axle, and a pair of resilient rods which connect said wick holding said rods having concave portions adapted to engage projections on the said journal box.

2. In a standard railroad car journal box having a standard journal bearing wedge, a car axle, threads cut on the ends of said axle, ring collars mounted on said threads, a roller bearing mounted on said axle, a semi-circular outer race at the top of said bearing, the exterior of said race conforming to the standard brass journal bearing, a wick, the bottom of which rests on the bottom of the journal box, the ends of said wick contacting the journal adjacent the ends of the roller bearing, the bottom of said wick being immersed in oil, resilient means formed to yieldingly engage inwardly extending projections on the journal box, a pair of wick holders, and a pair of resilient rods which connect said wick holders, said rods having concave portions adapted to engage projections on the said journal box.

3. In a standard railroad car journal box having a standard journal bearing wedge, a car axle, threads cut on the ends of said axle, ring collars mounted on said threads, a roller bearing mounted on said axle, a semi-circular outer race at the top of said bearing, the exterior of said race conforming to the standard brass journal bearing, a wick, the bottom of which rests on the bottom of the journal box, means at each end of said wick which hold the ends of said wick against said axle adjacent the ends of the roller bearing, the bottom of said wick being immersed in oil, a pair of wick holders having teeth thereon which engage said wick, a pair of resilient rods which connect said wick holders, said rods having portions adapted to engage inwardly extending projections on a standard journal box.

4. In a standard railroad car journal box having a standard journal bearing wedge, a car axle, threads cut on the ends of said axle, ring rollers mounted on said threads, a roller bearing mounted on said axle, a semi-circular outer race at the top of said bearing, the exterior of said race conforming to the standard brass journal bearing, a wick, the bottom of which rests on the bottom of the journal box, means at each end of said wick which hold the ends of said wick against said axle adjacent the ends of the roller bearing, the bottom of said wick being immersed in oil, means to prevent said wick moving longitudinally, said means comprising a pair of rods which connect said wick-holding means, the center of said rods being formed to yieldingly engage inwardly extending projections on the standard journal box.

HARLEY E. ANDERSON.